United States Patent [19]
Lampes et al.

[11] Patent Number: 5,700,132
[45] Date of Patent: Dec. 23, 1997

[54] TURBINE BLADE HAVING OPPOSING WALL TURBULATORS

[75] Inventors: Elias Harry Lampes, Lynn; Craig Robert Jacobson, Peabody; Robert Francis Manning, Newburyport, all of Mass.

[73] Assignee: General Electric Company

[21] Appl. No.: 809,604

[22] Filed: Dec. 17, 1991

[51] Int. Cl.⁶ .................................................. F01D 5/18
[52] U.S. Cl. .................. 416/97 R; 416/96 A; 415/115
[58] Field of Search .................... 415/115; 416/97 R, 416/96 A, 232, 233; 89/14.1

[56] References Cited

U.S. PATENT DOCUMENTS

| | | | |
|---|---|---|---|
| 3,628,885 | 12/1971 | Sidenstick et al. | 416/97 |
| 4,180,373 | 12/1979 | Moore et al. | 416/97 R |
| 4,236,870 | 12/1980 | Hucul, Jr. et al. | 416/97 R |
| 4,257,737 | 3/1981 | Andress et al. | 416/97 R |
| 4,278,400 | 7/1981 | Yamarik et al. | 416/97 R |
| 4,416,585 | 11/1983 | Abdel-Messeh | 416/97 R |
| 4,474,532 | 10/1984 | Pazder | 416/97 R |
| 4,514,144 | 4/1985 | Lee | 416/96 R |
| 4,515,526 | 5/1985 | Levengood | 416/96 R |
| 4,775,296 | 10/1988 | Schwarzmann et al. | 415/115 |
| 4,992,026 | 2/1991 | Ohtomo et al. | 415/115 |
| 5,052,889 | 10/1991 | Abdel-Messeh | 416/97 R |

FOREIGN PATENT DOCUMENTS

| | | | |
|---|---|---|---|
| 2112467 | 7/1983 | United Kingdom | F01D 5/18 |

OTHER PUBLICATIONS

J.C. Han et al., "Augmented Heat Transfer in Square Channels With Parallel, Crossed, and V-Shaped Angled Ribs," submitted to ASME Journal of Heat Transfer, Jun. 1990, pp. 1–23 and Figures 1–13.

S.D. Spring, "Improved Methods For Determining Heat Transfer," The Leading Edge, Winter 1987/1988, Contents page and pp. 4–9.

Metzger–Vedula–Breen, "The Effect of Rib Angle and Length on Convection Heat Transfer in Rib–Roughened Triangular Ducts," ASME–JSME Thermal Engineering Conference vol. 3, 1987, pp: 327–333.

Metzger–Fan–Yu, "Effects of Rib Angle and Orientation on Local Heat Transfer in Square Channels with Angled Roughness Ribs", *Compact Heat Exchangers*, copyright 1989, pp: Title and 151–167.

*Primary Examiner*—Michael J. Carone
*Assistant Examiner*—Theresa M. Wesson

[57] ABSTRACT

A turbine blade includes an airfoil having opposing first and second sides and an internal passage extending longitudinally therebetween. A plurality of first turbulator ribs extend from the first side into the passage, and a plurality of second turbulator ribs extend from the second side into the passage. The first and second ribs are different in configuration from each other for obtaining different heat transfer enhancements on the first and second sides for reducing pressure losses and cooling air flow requirements.

12 Claims, 4 Drawing Sheets

TURBINE BLADE HAVING OPPOSING WALL TURBULATORS

TECHNICAL FIELD

The present invention relates generally to gas turbine engines, and, more specifically, to air cooled turbine blades and vanes therein.

BACKGROUND ART

In a conventional gas turbine engine, a compressor pressurizes air which is channeled to a combustor, mixed with fuel, and ignited for generating combustion gases which flow to a turbine disposed downstream therefrom. The turbine extracts energy from the hot combustion gases for powering the compressor. Energy from the combustion gases is also used to propel an aircraft in flight, with one or more turbines either driving a conventional fan for obtaining thrust, or simply discharging the combustion gases from a conventional exhaust nozzle for generating thrust for powering the aircraft.

Conventional turbines include one or more stages of stationary stator nozzles or vanes and rotating rotor blades which typically extract energy from the combustion gases by reaction. The blades and vanes are typically air cooled by a portion of the air pressurized by the compressor in order to provide acceptable life in the gas turbine engine. However, any portion of the compressed air which is utilized for cooling the blades and vanes is not available for undergoing combustion which, therefore, reduces the overall efficiency of the engine. Accordingly, it is desirable to use as little of the compressed air as possible in cooling the blades and vanes consistent with obtaining relatively long useful life of the blades and vanes, which is typically accomplished by providing heat transfer enhancement members such as elongate turbulator ribs within the blades and vanes.

Since gas turbine engine blades and vanes include an airfoil portion over which the combustion gases flow, which airfoil portion includes an internal passage for channeling the cooling air and also contains the turbulator ribs, the term blade as used herein shall mean any member placed within the gas turbine engine flowpath over which flows the combustion gases, such as conventional rotor blades or stator vanes or nozzles.

Turbulator ribs typically used in such blades are conventionally formed as part of the blade casting and project inwardly into the internal passage of the blade through which the cooling air is channeled. The ribs enhance the convective heat transfer coefficient along the inner surface of the blade by tripping or disrupting the cooling air boundary layer which is caused to separate from the internal surface and then reattach downstream from the rib. The heat transfer coefficient enhancement is conventionally defined as the convective heat transfer coefficient effected by the ribs divided by the convective heat transfer coefficient over a smooth surface without turbulator ribs, and has values ranging up to several times that of the latter.

Enhancement is conventionally related to the height or projection of the ribs into the internal passage, the distance between opposing walls of the internal passage, and the distance or spacing longitudinally between the ribs. The typical ratio of longitudinal spacing between turbulator ribs relative to rib height ranges from about 5.0 to about 10.0, and the ratio of the rib height to opposing wall distance has values of about 0.05 and up. And, exemplary turbulator ribs may include ribs disposed perpendicularly to the direction of cooling flow, ribs inclined relative to the direction of the cooling airflow, and ribs disposed on opposite walls of the internal passage that are longitudinally positioned either in-line or staggered with respect to each other.

Turbulator ribs provide localized increases in enhancement which decrease rapidly in value downstream from each individual rib. Accordingly, the ribs are typically uniform in configuration, uniform in height or projection into the internal passage, and uniform in longitudinal spacing therebetween for obtaining a generally uniform, or average, enhancement along the surface of the blade cooled by the ribs.

The various conventional turbulator ribs result in different amounts of enhancement, along with pressure losses associated therewith. Since the ribs project into the internal passage and partially obstruct the free flow of the cooling air therethrough, they provide resistance to the flow of the cooling air which results in pressure losses. Although higher ribs generally increase enhancement, the pressure drop associated therewith also increases. Accordingly, the effectiveness of turbulator ribs must be evaluated by their ability to provide effective enhancement without undesirable levels of pressure losses associated therewith.

The heat transfer enhancement required from the turbulator ribs is selected for particular blade designs and operating environment including the temperature of the combustion gases flowable thereover and stresses occurring in the blade. A primary design parameter is conventionally known creep life which is a function of temperature and stress occurring in the blade. Both the temperature and stress experienced by the blade varies around its surface, with a specific location resulting in minimum creep life for the blade. The minimum creep life for the blade must be selected to ensure an acceptable service life of the blade and is typically increased as required by providing increased cooling of the blade. Accordingly, a conventional blade is typically designed with equally configured turbulator ribs on both sides of the airfoil in the cooling air passages to provide uniform heat transfer enhancement on both sides of the blade for obtaining an acceptable service life. The pressure drop caused by the turbulator ribs is suitably accommodated by providing sufficient airflow and supply or driving pressure for effective operation.

OBJECTS OF THE INVENTION

Accordingly, one object of the present invention is to provide a new and improved gas turbine engine blade.

Another object of the present invention is to provide an improved blade having a local increase in enhancement with reduced pressure loss and cooling flow supply pressure.

Another object of the present invention is to provide an improved blade having improved creep life with reduced cooling flow.

DISCLOSURE OF INVENTION

A turbine blade includes an airfoil having opposing first and second sides and an internal passage extending longitudinally therebetween. A plurality of first turbulator ribs extend from the first side into the passage, and a plurality of second turbulator ribs extend from the second side into the passage. The first and second ribs are different in configuration from each other for obtaining different heat transfer enhancements on the first and second sides.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawings in which:

MODE(S) FOR CARRYING OUT THE INVENTION

Figure 1:
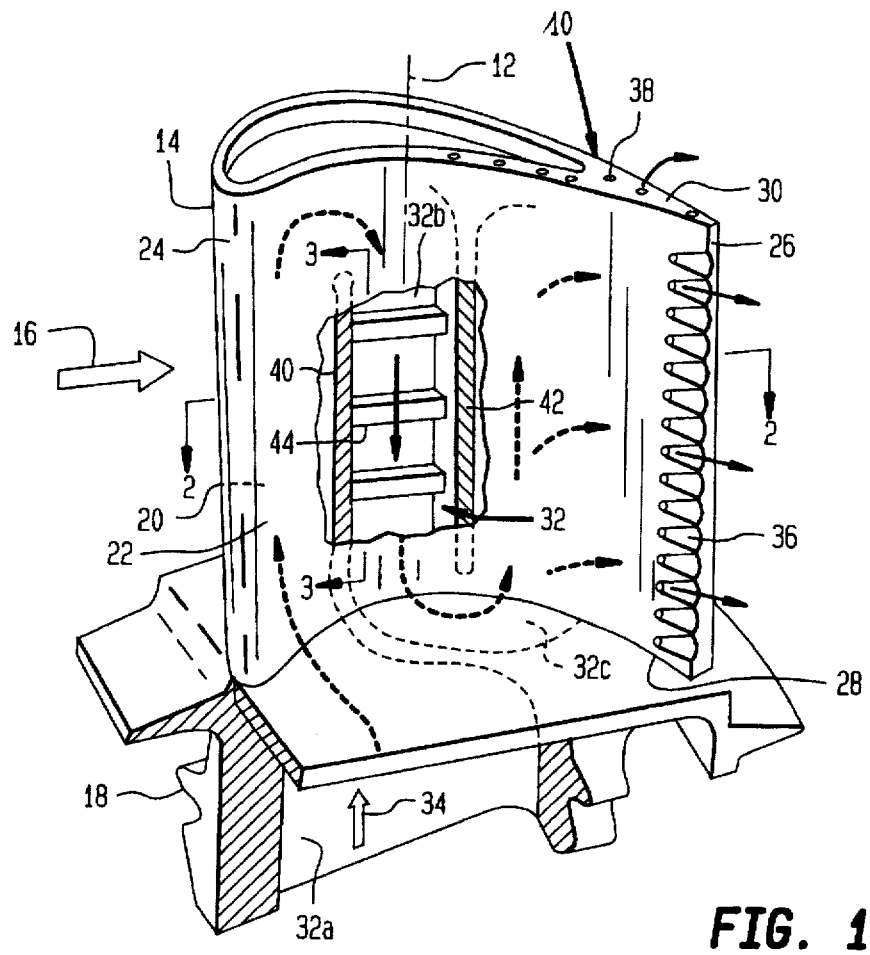
FIG. 1 is a schematic, perspective view, partly in section, of an exemplary gas turbine engine blade including turbulators in accordance with one embodiment of the present invention.

Illustrated schematically in FIG. 1 is an exemplary gas turbine engine rotor blade 10 having a longitudinal or radial axis 12. The blade 10 includes an airfoil 14 which is conventionally disposed in a gas turbine engine (not shown) and over which flows hot combustion gases 16 generated by a conventional combustor (not shown). As used herein, the term blade shall mean any member disposed within a hot gas flow such as the combustion gases 16 and, for example, includes the rotor blade 10 illustrated, and stator vanes or nozzles. The blade 10 as a rotor blade is conventionally joined to a rotor disk (not shown) by a conventional dovetail 18 extending downwardly from the airfoil 14. The blade 10 may also represent a conventional stator vane or nozzle wherein the airfoil 14 is conventionally joined to a stator casing and conventionally channels the combustion gases 16 to conventional rotor blades disposed downstream therefrom (not shown).

The outer configuration of the airfoil 14 is conventional and includes a first sidewall, or side, 20, which is also known as the suction side of the airfoil 14 and is convex outwardly toward the combustion gases 16. The airfoil 16 also includes a second sidewall, or side, 22, which is also known as the pressure side of the airfoil 14 and is concave outwardly toward the combustion gases 16. The first and second sides 20 and 22 are joined together at a longitudinally extending leading edge 24 and a trailing edge 26 and extend longitudinally from a root 28 to a tip 30. The root 28 is the lowermost portion of the airfoil 14 over which the combustion gases 16 flow, and the tip 30 is the outermost portion of the airfoil 14 over which the gases 16 flow.

Figure 2:
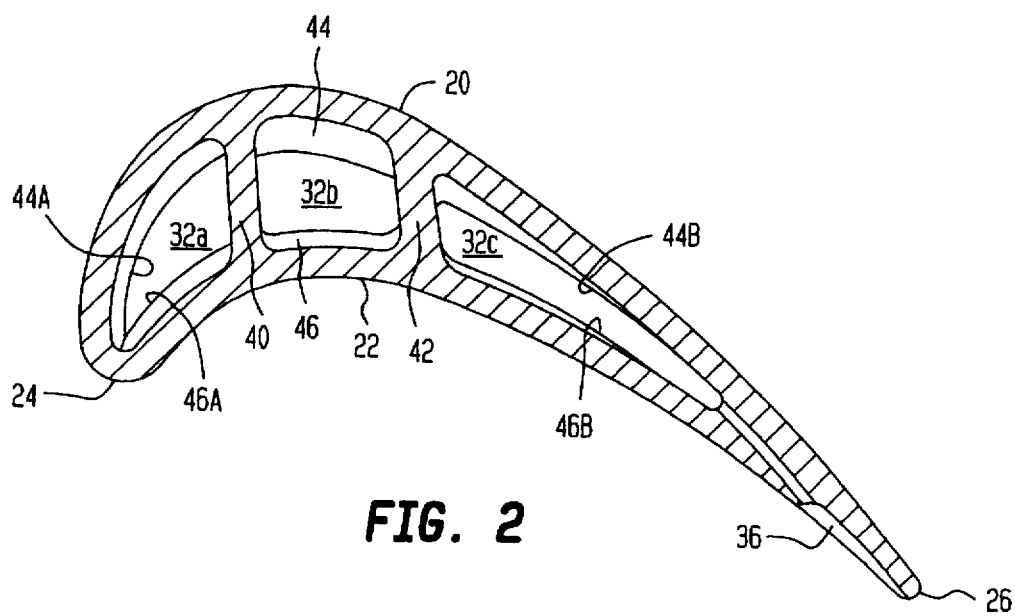
FIG. 2 is a transverse partly sectional view of the blade illustrated in FIG. 1 taken along line 2—2.

Referring to both FIGS. 1 and 2, the airfoil 14 includes an internal passage 32 which extends longitudinally between the first and second sides 20 and 22 for channeling compressed air 34 as cooling air to cool the airfoil 14. More specifically, the cooling air 34 is conventionally channeled from a compressor of the gas turbine engine (not shown) through the dovetail 18 and upwardly into the airfoil 14. The passage 32 in the exemplary embodiment illustrated is a serpentine passage including a leading edge passage 32a which extends from the dovetail 18 upwardly through the airfoil 14 to the tip 30 wherein the air 34 is turned 180° into a midchord passage 32b and flows longitudinally downwardly in the airfoil 14 to the root 28 wherein the air 34 is again turned 180° upwardly into a trailing edge passage 32c which extends to the tip 30. The air 34 from the trailing edge passage 32c is conventionally discharged from the airfoil 14 through a plurality of trailing edge apertures 36 and tip holes 38 for example.

In the exemplary embodiment illustrated in FIGS. 1 and 2, the internal passage 32 is defined between the first and second sides 20 and 22, with the three portions thereof being additionally defined by an upwardly extending first partition 40 extending from the dovetail 18 longitudinally upwardly between the first and second sides 20 and 22 to form a gap with the tip 30 for allowing the air 34 to turn from the leading edge passage 32a downwardly into the midchord passage 32b. A second partition 42 is spaced aft of the first partition 40 and extends downwardly from the tip 30 toward the root 28 to form a gap adjacent to the dovetail 18 in which the cooling air 34 turns from the midchord passage 32b upwardly into the trailing edge passage 32c.

During operation in a conventional gas turbine engine, the blade 10 is heated by the combustion gases 16 and is subject to various conventional stresses such as centrifugal stresses for the exemplary rotor blade 10. Conventionally known creep occurs in the blade 10 due to elevated temperatures and high stress experienced during operation and is most significant in the airfoil 14. Analysis or testing, or both, may be used to determine that location on the airfoil 14 having the minimum creep life which must be greater than the acceptable service life for the particular design application. In order to improve the creep life of the airfoil 14, conventional turbulator ribs (not shown) are typically disposed in the passage 32 for providing improved heat transfer for reducing the temperatures experienced by the airfoil 14. Conventional turbulator ribs exist in various forms and are typically provided on both sides 20 and 22 of the airfoil 14 in the passage 32 for providing uniform heat transfer enhancement. Enhancement is conventionally known as the value of the conventionally known convective heat transfer coefficient effected by the turbulator ribs divided by the convective heat transfer coefficient for a smooth surface without turbulator ribs. Enhancement due to a smooth surface has the value of 1.0, and enhancement due to conventional turbulator ribs may reach several times that value.

In order to provide acceptable service life of the airfoil 14, the turbulator ribs are selected for providing a suitable amount of enhancement at the particular location of the airfoil 14 subject to maximum temperature and stress combination, and therefore minimum creep life. In this way, the creep life may be increased due to the enhancement which decreases the temperature at that location. However, since the turbulator ribs extend into the passage 32 they necessarily produce pressure losses in the cooling air 34 flowing therethrough which, therefore, requires that the cooling air 34 be provided with a predetermined flowrate and driving pressure to ensure acceptable flow thereof through the passage 32 and out the trailing edge apertures 36 and the tip holes 38.

In accordance with the present invention, a plurality of first turbulator ribs 44 and a plurality of opposing second turbulator ribs 46 are provided in the passage 32 which are different in configuration from each other so that different enhancements therefrom may be obtained. In a conventional blade, equally or identically configured turbulator ribs are typically provided on both sides thereof for providing equal enhancements on both sides of the blade at a particular longitudinal or radial position for obtaining the required creep life. However, such equally configured ribs also introduce pressure losses in the cooling air flow which must be suitably accommodated. By providing differently configured first and second ribs 44 and 46 in accordance with the present invention, enhancement can be varied locally in order to achieve desired creep life requirements with reduced cooling flow. For example, the required amount of enhancement may be provided on that side of the airfoil 14 subject to the high temperature and stress condition, with a reduced amount of enhancement on the opposing side of the airfoil 14 with an attendant reduction in pressure losses in the cooling air 34 channeled through the passage 32. The reduced pressure losses, therefore, allow for a reduction in supply pressure of the cooling air 34 while still obtaining acceptable enhancement where required.

Also in this exemplary embodiment, the airfoil first and second sides 20, 22 which define the passages 32a, 32b, and 32c are preferably imperforate so that the cooling air 34 is channeled in a serpentine path therethrough without leakage through the sides 20, 22. This reduces the cooling air requirements, with the airfoil 14 being cooled solely by the turbulator ribs.

Furthermore, conventional, equally configured turbulators that provide equal enhancement on both sides of the blade more quickly increase the temperature of the cooling air which decreases the ability of the so heated cooling air to cool downstream portions of the blade. Accordingly, by providing the reduced enhancement second turbulator ribs 46, less heat is picked up by the cooling air 34 which reduces its temperature rise, thusly allowing the cooling air 34 to more effectively cool downstream portions of the airfoil 14. This too, allows for yet a further reduction in the amount of the cooling air 34 required for effectively cooling the blade 10. Furthermore, the blade 10 experiences a different temperature distribution over the first and second sides 20, 22 that alters differential thermal stresses and resulting creep, which may be conventionally exploited for either increasing blade creep life, or reducing cooling flow, or both.

Figure 3:
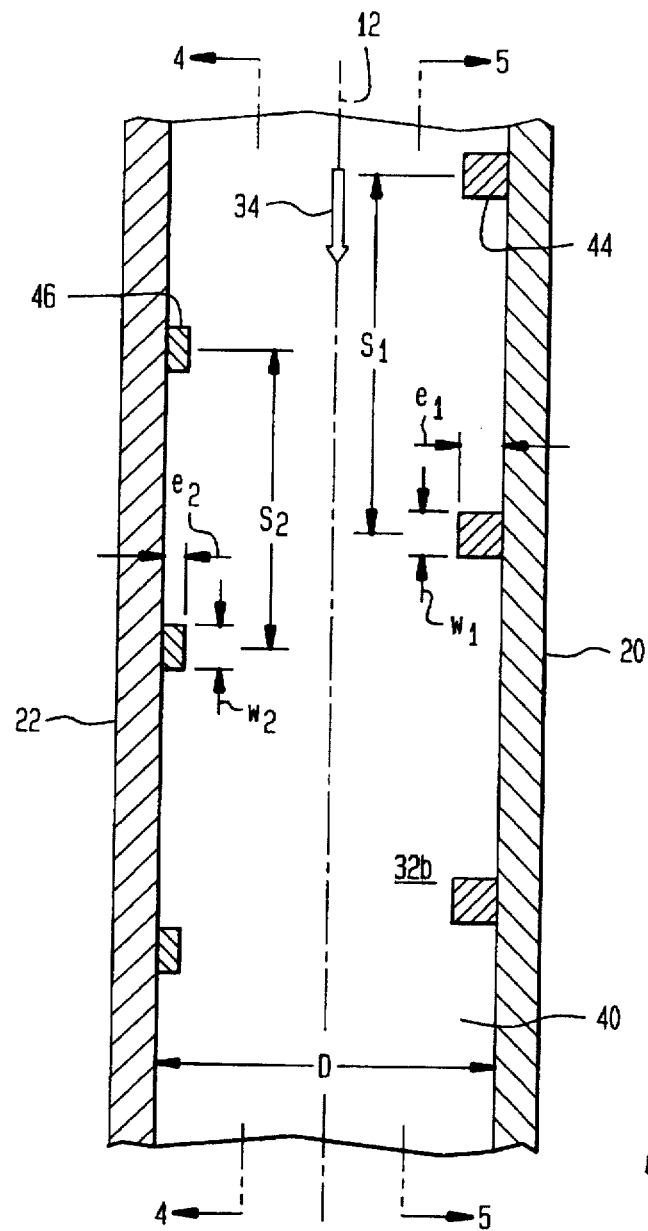
FIG. 3 is a longitudinal sectional view of a portion of the midchord passage of the blade illustrated in FIG. 1 taken along line 3—3.
Figure 4:
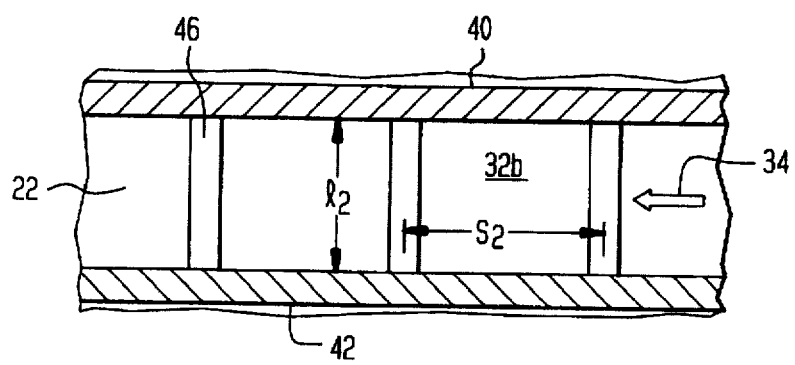
FIG. 4 is a longitudinal, partly sectional view of the midchord passage illustrated in FIG. 3 taken along line 4—4.
Figure 5:
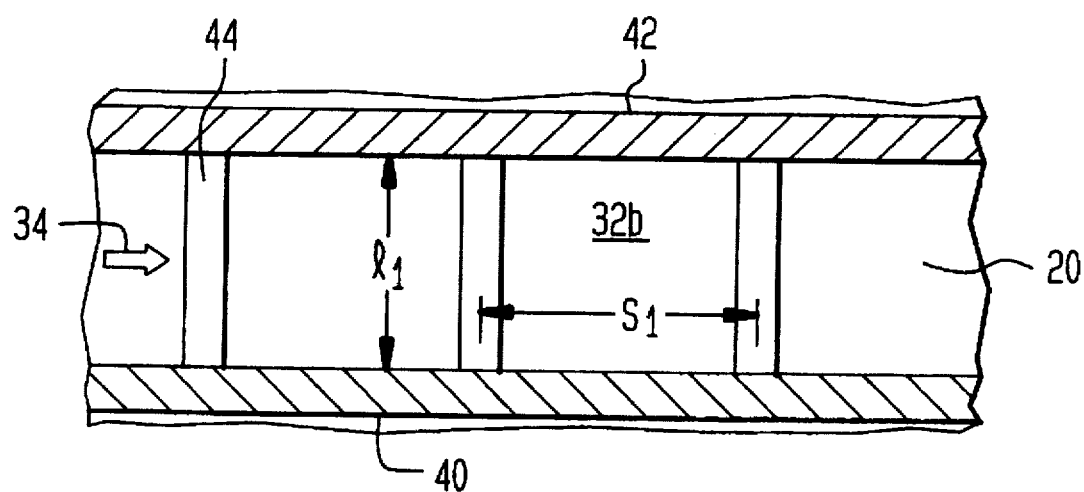
FIG. 5 is a longitudinal, partly sectional view of the midchord passage illustrated in FIG. 3 taken along line 5—5.

The first and second ribs 44 and 46 are illustrated in more particularity in FIGS. 3–5. In this exemplary embodiment, both the first and second ribs 44 and 46 are elongate and extend completely along the first and second sides 20 and 22, respectively, in the passage 32 such as the exemplary midchord passage 32b illustrated. The first ribs 44 as illustrated in FIGS. 3 and 5 have substantially equal or identical configurations including extending perpendicularly inwardly from the first side 20 into the midchord passage 32b at a first height $e_1$, and a first width $w_1$ measured along the longitudinal axis 12 in the direction of flow of the cooling air 34. The first ribs 44 are parallel to each other and spaced longitudinally apart at a first longitudinal spacing $S_1$ measured between corresponding positions on adjacent first ribs 44 such as the centerlines thereof. The first and second sides 20 and 22 are laterally spaced apart at a distance D for flow of the cooling air 34 therebetween.

Similarly, and as shown in FIGS. 3 and 4, the second ribs 46 also have substantially equal or identical configurations including extending perpendicularly inwardly from the second side 22 into the midchord passage 32b at a second height $e_2$, and a second width $w_2$ measured along the longitudinal axis 12 in the direction of flow of the cooling air 34. The second ribs 46 are also parallel to each other and spaced apart longitudinally at a second longitudinal spacing $S_2$.

The respective first and second ribs 44 and 46 provide convective heat transfer enhancement on the respective first and second sides 20 and 22 in the midchord passage 32b which may be conventionally selected by varying the respective configurations of the first and second ribs 44 and 46 including the heights $e_1$, $e_2$, and the longitudinal spacings $S_1$ and $S_2$ for a given lateral spacing distance D since enhancement is conventionally related to the ratios $e_1/D$, $e_2/D$, $S_1/e_1$, and $S_2/e_2$.

In the exemplary embodiment illustrated in the Figures, the airfoil first, or convex, side is that side which is subject to reduced creep life, but for the present invention, although in an alternate embodiment of the blade 10, the second, or concave, side 22 could be subject to such reduced creep life. The minimum creep life region of a blade depends upon the particular blade design and environment, and may be conventionally determined. In order to increase the creep life of the blade 10, the first ribs 44, although being identical to each other, are configured differently from the second ribs 46 for effecting a first convective heat transfer enhancement for the first side 20 which is different or greater than a second convective heat transfer enhancement effected by the second ribs 46 for the second side 22.

For example, the second height $e_2$ of the second ribs 46 may be smaller than the first height $e_1$ of the first ribs 44 since enhancement is conventionally directly related to the height of turbulator ribs. More specifically, enhancement is directly related to the ratios $e_1/D$ and $e_2/D$, and since the sidewall spacing D is substantially the same for opposing ones of the first and second ribs 44, 46, then enhancement is determined primarily by the rib heights $e_1$, $e_2$. Although the parameter D represents the sidewall spacing in this exemplary embodiment, it may also represent the conventionally known hydraulic diameter which is four times the flow area divided by the wetted perimeter.

It is also conventionally known that enhancement is related to the ratio of rib longitudinal spacing over rib height, and therefore the ratio of the first spacing $S_1$ over the first height $e_1$ may be predeterminedly different than the ratio of the second spacing $S_2$ over the second height $e_2$ for obtaining the desired different first and second enhancements on the respective first and second sides 20 and 22. Typically, average enhancement has a maximum or peak value between S/e ratios of about 5 to 10 and decreases from the peak.

For the exemplary embodiment illustrated in FIG. 3, the first ribs 44 have a first height $e_1$ of about 0.8 mm and a first width $w_1$ of about 0.8 mm. The second ribs 46 have a second height $e_2$ of about 0.6 mm and a second width $w_2$ of about 1.0 mm. In accordance with one embodiment of the present invention, the second width $w_2$ of the second ribs 46 is larger than the first width $w_1$ of the first ribs 44 for reducing the second enhancement of the second ribs 46 relative to the first enhancement from the first ribs 44. In particular, enhancement decreases as the width-to-height ratio (w/e) increases. Therefore, enhancement may be varied by varying the S/e and/or w/e ratios.

Also in the exemplary embodiment schematically illustrated in FIG. 3, the second ribs 46 are shorter than the first ribs 44, but have substantially equal ratios of $S_1/e_1$ and $S_2/e_2$ with correspondingly different longitudinal spacings $S_1$ and $S_2$. Or, the longitudinal spacings $S_1$ and $S_2$ may be equal, for further reducing the second enhancement with the shorter second ribs 46. In this way, substantially uniform, but different, enhancements may be obtained along the respective first and second sides 20 and 22 due to the first and second ribs 44 and 46 having different heights, but same longitudinal spacing to height ratios. For example, the longitudinal spacing to height ratios of the first and second ribs 44 and 46 may be in the range of about 5 to 10, and identical to each other in the preferred embodiment.

Accordingly, by using the differently configured first and second turbulators 44 and 46, instead of conventional equally configured turbulators on both sides 20 and 22, the heat transfer enhancement can be increased at selected locations where required and decreased at other locations while minimizing the required cooling flow and overall pressure loss. An increase in blade creep life may, therefore, be obtained with a substantial reduction in flow and supply pressure of the cooling air 34 therethrough.

Figure 3A:
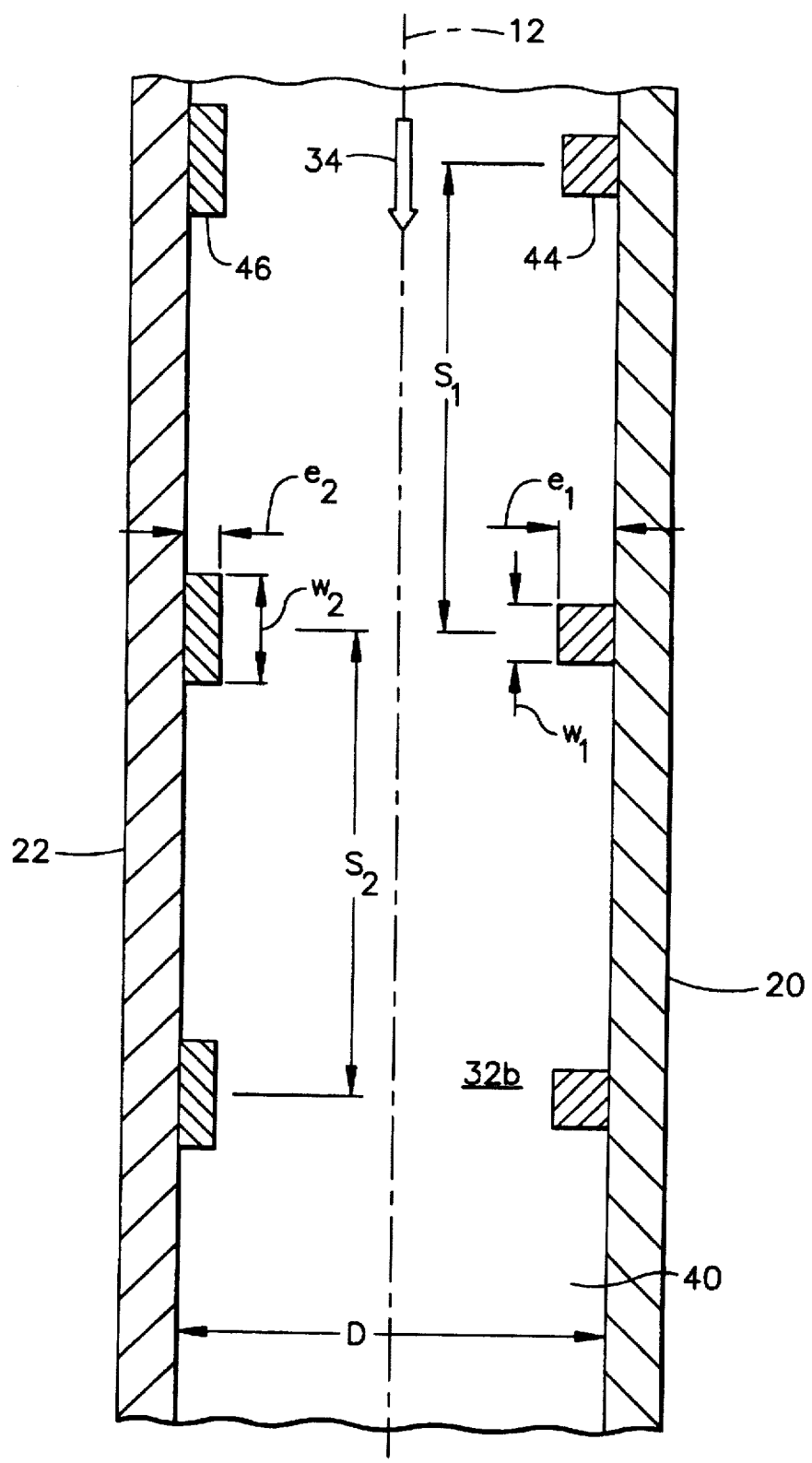
FIG. 3A is an alternate embodiment of the present invention depicted in FIG. 3.

As shown in FIG. 3, the second ribs 46 are preferably longitudinally staggered relative to the first ribs 44 for providing reduced pressure losses therein. In alternate embodiments, the first and second ribs 44 and 46 may be longitudinally aligned with each other as feasible depending upon the respective longitudinal spacings $S_1$ and $S_2$. Such alignment is depicted, for example, in FIG. 3A where longitudinal spacings $S_1$ and $S_2$ are equal. Different enhancement on the respective first and second sides 20 and 22 is maintained by varying respective rib height $e_1$, $e_2$. For a value of first rib height $e_1$ greater than second rib height $e_2$ with equivalent spacings $S_1$, $S_2$, the resultant ratio $S_1/e_1$ is less than $S_2/e_2$. Enhancement may also be varied, as stated hereinbefore, by varying respective rib widths $w_1$, $w_2$. In this embodiment, second width $w_2$ is depicted as greater than first width $w_1$.

Although the invention has been shown with respect to the midchord passage 32b as shown in FIGS. 1-5, the differently configured first and second ribs 44 and 46 may also be applied in any portion of the passage 32 within the blade 10 including the leading edge passage 32a and the trailing edge passage 32c as shown in FIG. 2. The first and second turbulators ribs are designated 44A and 46A for the leading edge passage 32a and extend from the first partition 40 to the leading edge 24. The first and second ribs 44A and 46A are spaced apart from each other at the first partition 40 but converge together as they approach the leading edge 24.

In the trailing edge passage 32c, the first and second ribs, designated 44B and 46B, each have a respective height which varies from a maximum value at the second partition 42 and decreases to a minimum, zero value where they blend with the respective first and second sides 20 and 22. However, the first and second ribs 44B and 46B are still effective for providing different enhancement on the respective first and second sides 20 and 22 in the trailing edge passage 32c since the respective height of the first and second ribs 44b and 46b directly opposite from each other may be suitably different.

In the exemplary embodiment illustrated in FIGS. 1 and 2, the passage 32 is a three path continuous passage with the cooling air 34 entering the leading edge passage 32a from the dovetail 18 and flowing in turn through the midchord passage 32b and then through the trailing edge passage 32c, and is then discharged from the trailing edge apertures 36 and the tip holes 38. Accordingly, the cooling air 34 necessarily absorbs heat from the airfoil 14 as it passes therethrough. By providing the differently configured first and second ribs 44 and 46 in upstream portions of the passage 32 such as in the leading edge passage 32a or the midchord passage 32b, heat absorbed by the cooling air 34 will be reduced as compared to conventionally equal sized opposing turbulators for thusly more effectively cooling the downstream portions of the airfoil 14 along the passage 32. For example, since the second turbulator ribs 46A disposed in the leading edge passage 32a effect a smaller enhancement than that effected by the first ribs 44A, less heat is absorbed by the cooling air 34 than that which would be absorbed if the second ribs 46A were configured identically to the first ribs 44A, and, therefore, the cooling air 34 remains cooler longer. The blade tip 30 and the portions of the airfoil 14 downstream from the leading edge passage 32a are more effectively cooled by the cooler, or less heated, cooling air 34.

Figure 6:
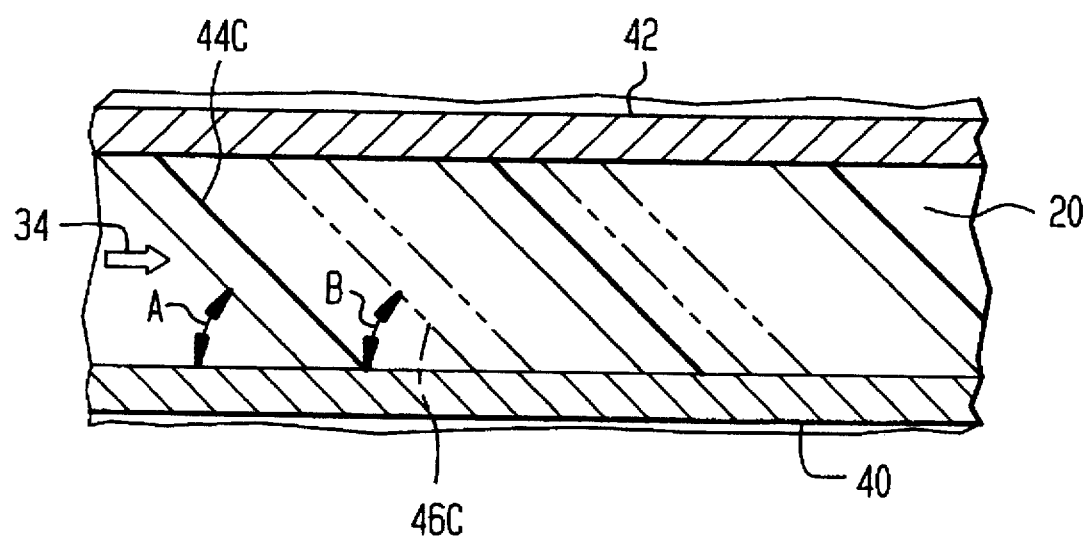
FIG. 6 is a longitudinal sectional view similar to FIG. 5 illustrating an alternate embodiment of turbulators in accordance with the present invention.

Although the invention has been disclosed with respect to a particular configuration of the first and second ribs 44 and 46, i.e., ribs disposed 90° to the direction of the cooling air 34, the invention may also be practiced with respect to various other conventional ribs. For example, illustrated in FIG. 6 is another embodiment of the present invention wherein the first and second ribs designated 44C and 46C (shown in phantom), are inclined relative to the direction of the cooling air 34 at respective acute angles A and B, which may be equal to each other for example. Angled ribs are conventionally known, but by configuring the opposing first and second ribs 44C and 46C differently from each other for obtaining different enhancements therefrom, the advantages discussed above may be obtained thereby. Of course, yet other types of turbulator ribs may be used in accordance with the teachings of the invention.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims.

We claim:

1. A turbine blade having a longitudinal axis comprising:
   an airfoil having a first side and an opposite second side joined together at a leading edge and a trailing edge and extending longitudinally from a root to a tip, and an internal passage extending longitudinally between said first and second sides for channeling air to cool said airfoil;
   a plurality of parallel first turbulator ribs extending from said first side into said passage and having substantially identical configurations including a first height, a first width, and being longitudinally spaced apart at a first longitudinal spacing for providing a first heat transfer enhancement for said first side;
   a plurality of parallel second turbulator ribs extending from said second side into said passage toward said first ribs and having substantially identical configurations including a second height, a second width, and being longitudinally spaced apart at a second longitudinal spacing for providing a second heat transfer enhancement for said second side; and
   said first and second ribs being different in configuration from each other so that said first and second enhancements are different.

2. A blade according to claim 1 wherein said second height of said second ribs is smaller than said first height of said first ribs.

3. A blade according to claim 1 wherein said second width of said second ribs is larger than said first width of said first ribs.

4. A blade according to claim 1 wherein the ratio of said first spacing over said first height is different than the ratio of said second spacing over said second height.

5. A blade according to claim 1 wherein:
   said second height of said second ribs is smaller than said first height of said first ribs; and
   the ratio of said first spacing over said first height is substantially equal to the ratio of said second spacing over said second height.

6. A blade according to claim 1 wherein:
   said airfoil first side is convex outwardly toward combustion gases flowable over said airfoil;
   said airfoil second side is concave outwardly toward said combustion gases flowable over said airfoil; and
   said first and second ribs are configured for providing said first enhancement greater than said second enhancement.

7. A blade according to claim 6 wherein said second height of said second ribs is smaller than said first height of said first ribs.

8. A blade according to claim 7 wherein said second width of said second ribs is larger than said first width of said first ribs.

9. A blade according to claim 8 wherein said second ribs are longitudinally staggered relative to said first ribs.

10. A blade according to claim 9 wherein said first and second ribs extend completely along said first and second sides, respectively, in said passage.

11. A blade according to claim 10 wherein said passage is a midchord passage in said airfoil.

12. A blade according to claim 10 wherein said passage is a leading edge passage in said airfoil.

* * * * *